United States Patent
Haufe et al.

(10) Patent No.: US 10,781,346 B2
(45) Date of Patent: Sep. 22, 2020

(54) CORROSION-INHIBITING, RADICALLY CUREABLE COMPOSITION

(71) Applicant: SIKA TECHNOLOGY AG, Baar (CH)

(72) Inventors: Markus Haufe, Zürich (CH); Max Hug, Zürich (CH); Mirdash Bakalli, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 235 days.

(21) Appl. No.: 15/751,114

(22) PCT Filed: Sep. 2, 2016

(86) PCT No.: PCT/EP2016/070710
§ 371 (c)(1),
(2) Date: Feb. 7, 2018

(87) PCT Pub. No.: WO2017/037227
PCT Pub. Date: Mar. 9, 2017

(65) Prior Publication Data
US 2018/0230347 A1    Aug. 16, 2018

(30) Foreign Application Priority Data
Sep. 2, 2015   (EP) .................................. 15183565

(51) Int. Cl.
*C09K 3/10* (2006.01)
*C09J 4/00* (2006.01)
*C08K 3/32* (2006.01)

(52) U.S. Cl.
CPC .................. *C09K 3/10* (2013.01); *C08K 3/32* (2013.01); *C09J 4/00* (2013.01); *C09K 3/1006* (2013.01); *C08K 2003/321* (2013.01); *C08K 2003/324* (2013.01); *C09K 2003/104* (2013.01); *C09K 2200/0625* (2013.01)

(58) Field of Classification Search
CPC .................................................... C09K 3/1006
See application file for complete search history.

(56) References Cited

U.S. PATENT DOCUMENTS

| | | | |
|---|---|---|---|
| 4,508,569 A | 4/1985 | Kumasaka et al. | |
| 2005/0070653 A1* | 3/2005 | Apitz | C04B 40/0039 524/417 |
| 2008/0282642 A1* | 11/2008 | Shah | B44C 3/02 52/741.4 |
| 2019/0112398 A1* | 4/2019 | Haufe | C08K 5/17 |

FOREIGN PATENT DOCUMENTS

| | | | |
|---|---|---|---|
| DE | 36 11 307 A1 | 10/1986 | |
| EP | 1 036 802 A1 | 9/2000 | |
| EP | 1 518 892 A1 | 3/2005 | |
| EP | 2 164 881 B1 | 8/2011 | |
| GB | 2465409 A * | 5/2010 | ............... C09K 3/10 |
| JP | S62-129376 A | 6/1987 | |
| WO | 2007/071636 A2 | 6/2007 | |

OTHER PUBLICATIONS

Nov. 8, 2016 International Search Report issued in International Patent Application No. PCT/EP2016/070710.

* cited by examiner

Primary Examiner — Vickey Nerangis
(74) *Attorney, Agent, or Firm* — Oliff PLC

(57) ABSTRACT

A composition for sealing joints, penetrations and other leaks in particular in the construction field, including at least one ethylenically unsaturated, radically polymerizable water-soluble compound, at least one radical initiator, water and at least one corrosion inhibitor including at least one phosphate. The corresponding composition has a corrosion-inhibiting effect with respect to metal.

16 Claims, No Drawings

CORROSION-INHIBITING, RADICALLY CUREABLE COMPOSITION

TECHNICAL FIELD

The invention relates to a corrosion-inhibiting, free-radically polymerizable composition for sealing joins, penetrations and other leak sources, especially in the construction sector.

PRIOR ART

Various kinds of materials are known for filling of cracks, defects and cavities in built structures and for sealing of joins and penetrations against the ingress of moisture. More particularly, sealants based on polyurethanes, epoxy resins and (meth)acrylates are used. Swellable polymers are widely used for the sealing of joins and penetrations.

Swellable polymers are polymer systems consisting of hydrophilic or oleophilic monomers. During the polymerization reaction, the monomers form macromolecular compounds capable of physically adsorbing liquid in their side chains. As a result, when liquid comes into contact with a cured swellable polymer, a great increase in volume (swelling) can be observed. In the course of swelling, the polymer builds up a contact pressure against the component to be sealed, which achieves sealing with respect to the adjacent liquid.

Free-radically curing systems are generally formed from monomers such as allyl, vinyl, methacrylic and acrylic compounds. The polymerization reaction commences when the monomers are brought into physical contact with a free-radical initiator, either by physical mixing of the components or through volatilization of a solvent. In the production of hydrophilic systems, monomers or prepolymers having hydrophilic groups, for example in the form of hydroxyl or ammonium groups, are used. Hydrogels are water-containing gels formed from polymers of hydrophilic compounds, e.g. (meth)acrylic monomers. In general, the polymers have to be crosslinked to form stable hydrogels.

The use of swellable polymers for sealing leak sources is known as prior art.

JP62-129376 describes a composition for preventing leaks from wastewater ducts. The composition comprises a (meth)acrylate, especially a magnesium or sodium salt thereof, a water-soluble polyethylene glycol (meth)acrylate that may contain 20-30% by weight of mono(meth)acrylate units, and a polymerization catalyst.

WO2007/071636 discloses a multicomponent swelling paste material consisting of hydrophilic or oleophilic monomers or oligomers, an organic activator and an organic free-radical initiator. The swelling paste material is to have a short curing time, good storability and easy applicability.

EP2164881B1 discloses a sealant based on polyethylene glycol dimethacrylates having a weight-average molecular weight of more than 5000 g/mol. The sealant proposed is said to have improved swellability and elevated elongation at break.

Water-based swellable polymers such as poly(meth)acrylates have been used successfully for many years for sealing of joins and penetrations in the construction sector and for grouting cracks in reinforced concrete structures. However, systems of this kind, owing to comparatively low pH values, are under discussion with regard to a possible corrosion risk for reinforcing rods in reinforced concrete structures. The acrylate-based sealants that are currently commercially available cannot prevent the corrosion of previously damaged reinforced concrete. As a result, (meth)acrylate-based hydrophilic systems are no longer accepted in Germany for crack injections in reinforced concrete.

Against this background, there is a need for water-based swellable polymers that have a corrosion-inhibiting effect with respect to metal and are consequently suitable for sealing reinforced concrete structures. Another aim of the invention is to provide a water-based sealant suitable as injection medium for crack sealing. The sealant is to have a minimum viscosity, an appropriate gel time and adequate swelling.

SUMMARY OF THE INVENTION

It is therefore an object of the invention to provide a composition for sealing joins and penetrations that overcomes the disadvantages of the prior art.

It has been found that, surprisingly, this object is achieved by a composition as claimed in claim 1. Advantageous embodiments of the invention are detailed in the dependent claims.

Accordingly, the present invention relates to a composition for sealing joins, penetrations and other leak sources, especially in the construction sector, comprising:
a) at least one ethylenically unsaturated, free-radically polymerizable water-soluble compound,
b) at least one free-radical initiator,
c) water,
d) at least one corrosion inhibitor comprising at least one phosphate.

A hydrogel obtainable by polymerizing the composition of the invention satisfies the conditions of the corrosion test according to DIN EN 480-14, which means that reinforcing rods ensheathed with the hydrogel exhibit passivation and no corrosion phenomena are observed even in the presence of an applied potential difference. The cured composition of the invention thus exhibits electrochemical compatibility with reinforced concrete structures.

Moreover, the composition of the invention has a sufficiently low viscosity, an appropriate gel time range and also adequate swelling, which means that it is suitable for various sealing applications in the construction sector.

The present invention is additionally concerned with a method of sealing joins, penetrations and other leak sources, especially in the construction sector, as claimed in claim 11 and with a method of creating a steel-passivating layer in a cavity of a previously damaged reinforced concrete structure as claimed in claim 12.

The present invention additionally also relates to a use of the composition of the invention as injection medium as claimed in claim 13.

In addition, the present invention relates to a hydrogel obtainable by polymerizing the composition of the invention as claimed in claim 14 and to a use of the hydrogel for sealing joins, penetrations and other leak sources, especially in the construction sector, as claimed in claim 15.

"A polymerizable compound" means that the compound can be polymerized using any conventional synthetic method at temperatures in the range from $-10°$ C. to $+60°$ C.

"A water-soluble compound" means that the compound has such a water solubility that it can form an at least 5.0 percent by weight, preferably at least a 10.0 percent by weight, clear aqueous solution at $20°$ C. However, particular preference is given to water-soluble compounds that are fully miscible with water at temperatures between $-5°$ C. and $+40°$ C.

The at least one ethylenically unsaturated, free-radically polymerizable compound is to be water-soluble and crosslinkable, such that the composition forms a hydrogel on polymerization and crosslinking. Ethylenically unsaturated, free-radically polymerizable compounds having only low water solubility are unsuitable since they do not mix with water and their curing products are not hydrogels.

"Crosslinkable" means that the compounds, during the polymerization reaction, form macromolecules joined to form a three-dimensional network. The joining can be achieved either directly in the course of formation of the macromolecules or through reactions on already existing polymers. The crosslinking can be conducted in the presence of an external crosslinking agent or without external crosslinking agent. Preference is given to conducting the crosslinking without external crosslinking agent, in which case the compound (monomer, prepolymer) constitutes a self-crosslinking polymer system.

"A phosphate" means a salt of orthophosphoric acid ($H_3PO_4$). In salts of orthophosphoric acid, all or some of the hydrogen ions of the orthophosphoric acid have been replaced by cations. Examples of salts of orthophosphoric acid are alkali metal and alkaline earth metal salts and ammonium salts of orthophosphoric acid.

The expression "(meth)acrylic" hereinafter always covers both methacrylic and acrylic. Correspondingly, (meth)acryloyl always covers methacryloyl or acryloyl. A (meth)acryloyl group is also known as (meth)acrylic group. A (meth)acrylic compound comprises one or more (meth)acryloyl groups.

A "hydrogel" is a water-containing gel that contains hydrophilic polymers. The polymer may be crosslinked, for example via covalent bonds (a chemical gel) or by noncovalent bonds, i.e. ionic interactions or hydrogen bonds (a physical gel).

The term "open time" is understood to mean the period of time within which the commixed constituents of the polymerizable composition are processible. The end of the open time is generally associated with an increase in the viscosity of the composition, such that processing of the composition is no longer possible.

The term "a previously damaged reinforced concrete structure" is understood to mean a reinforced concrete structure having defects. The defects are cracks and holes in the concrete. Preferably, the steel in these defects is no longer surrounded by concrete (as in the original undamaged condition). The steel may be in a corroded or non-corroded condition in the defects.

The ethylenically unsaturated, free-radically polymerizable water-soluble compound may be a monomer, an oligomer, a prepolymer or a polymer. The ethylenically unsaturated, free-radically polymerizable water-soluble compound may have a molecular weight or, if it is an oligomer, prepolymer or polymer with a molecular weight distribution, a weight-average molecular weight of not more than 12 000 g/mol, preferably not more than 8000 g/mol and more preferably not more than 4000 g/mol. The number-average molecular weight can be determined by gel permeation chromatography (GPC) with a polystyrene standard.

It has also been found that the corrosion-inhibiting properties of the composition of the invention are particularly advantageous when the weight ratio of the at least one ethylenically unsaturated, free-radically polymerizable water-soluble compound to water is in the range from 0.1:1 to 3:1, preferably in the range from 0.5:1 to 1.5:1.

Preferably, the at least one ethylenically unsaturated, free-radically polymerizable water-soluble compound has a proportion by weight of 25 to 65.0 percent by weight, preferably of 35 to 55 percent by weight, based on the total weight of the composition.

Preferably, the at least one ethylenically unsaturated, free-radically polymerizable water-soluble compound comprises at least one water-soluble (meth)acrylic compound. (Meth)acrylic compounds are particularly suitable for the present invention because they have good water miscibility and have good polymerizability in aqueous solution at temperatures between 5° C. and 40° C.

When the at least one ethylenically unsaturated, free-radically polymerizable water-soluble compound contains more than one (meth)acrylic compound, the proportion by weight of the at least one ethylenically unsaturated, free-radically polymerizable water-soluble compound is calculated on the basis of the sum total of the weights of the individual (meth)acrylic compounds.

Preferably, the composition comprises at least one water-soluble (meth)acrylic compound comprising one (meth)acryloyl group and/or at least one water-soluble (meth)acrylic compound comprising two or further (meth)acryloyl groups.

Preferably, the at least one water-soluble (meth)acrylic compound comprises a hydroxy-functional (meth)acrylate, a carboxyl-functionalized (meth)acrylic compound, a salt or an anhydride of a carboxyl-functionalized (meth)acrylic compound, a polyether (meth)acrylate, a polyether di(meth)acrylate, a (meth)acrylamide, a (meth)acrylate comprising a quaternary nitrogen group, a (meth)acrylamide comprising a quaternary nitrogen group or a mixture thereof.

A hydroxy-functional (meth)acrylate is a (meth)acrylate comprising one or more hydroxyl groups.

A carboxyl-functionalized (meth)acrylic compound is a (meth)acrylic compound comprising one or more carboxyl groups, for example (meth)acrylic acid or methacrylates comprising one or more carboxyl groups. Suitable examples of carboxyl-functionalized (meth)acrylic compounds are (meth)acrylic acid, itaconic acid, maleic acid and other adducts of hydroxyethyl methacrylate with anhydrides.

Suitable examples of salts of carboxyl-functionalized (meth)acrylic compounds are salts of (meth)acrylic acid such as sodium (meth)acrylate, potassium (meth)acrylate and magnesium di(meth)acrylate.

Polyether (meth)acrylate and polyether di-, tri-, tetra-, penta- or hexa(meth)acrylate are polyethers comprising one or more (meth)acrylate groups, where the (meth)acrylate groups are preferably at the ends of the polyether molecule chains. The polyether is more preferably a polyethylene glycol (PEG), a methoxy polyethylene glycol (MPEG) or a polyethylene glycol-polypropylene glycol (PEG/PPG) copolymer, especially a block copolymer.

Polyether (meth)acrylates and polyether di(meth)acrylates also include polyethers having one or two (meth)acrylate groups, where the polyether also has further structural units, for example urethane groups. This group of polyethers includes oligomers or prepolymers which are obtained by reaction of polyether polyols, especially polyether diols or polyether monools, with compounds containing at least two functional groups reactive toward hydroxyl groups, for example polyisocyanates.

For example, polyether (meth)acrylates and polyether di(meth)acrylates can be obtained from the reaction of polyether polyols or polyether monools such as PEG, PEG/PPG copolymers, MPEG or MPEG/PPG copolymers with polyisocyanates in order to generate an isocyanate-functional compound, in which case the resulting isocyanate compound is then reacted with a hydroxy-functional (meth)

acrylate such as hydroxyethyl methacrylate. In the case of PEG/PPG block copolymers, the proportion by weight of PEG should preferably be at least 30 percent by weight in order that the polyether is sufficiently water-soluble.

Examples of suitable polyether (meth)acrylates and polyether di(meth)acrylates are PEG di(meth)acrylates such as PEG 200 dimethacrylate, PEG 400 dimethacrylate, PEG 600 dimethacrylate, PEG 2000 dimethacrylate, MPEG (meth)acrylates such as MPEG 350 (meth)acrylate, MPEG 550 (meth)acrylate, MPEG 1000 (meth)acrylate and MPEG 2000 (meth)acrylate.

The composition preferably does not comprise any constituents that can promote corrosion in aqueous compositions, for example chlorides. Preferably, the total proportion by weight of the chloride-containing compounds has less than 0.5 percent by weight, more preferably less than 0.1 percent by weight, based on the total weight of the composition.

Preferably, the at least one water-soluble (meth)acrylic compound comprises a hydroxy (meth)acrylate which is preferably selected from the group consisting of hydroxyethyl acrylate (HEA), hydroxyethyl methacrylate (HEMA), hydroxypropyl acrylate (HPA), hydroxypropyl methacrylate (HPMA), hydroxybutyl acrylate (HBA) and hydroxybutyl methacrylate (HBMA), or a mixture thereof.

Preferably, the at least one water-soluble (meth)acrylic compound comprises a hydroxy-functional (meth)acrylate, a mixture comprising a hydroxy-functional (meth)acrylate and a salt of a carboxyl-functionalized (meth)acrylic compound or a mixture comprising a hydroxy-functional (meth)acrylate and at least one polyether (meth)acrylate, preferably MPEG methacrylate or polyether di(meth)acrylate.

Preferably, the at least one phosphate comprises an alkali metal, alkaline earth metal or ammonium salt of orthophosphoric acid. Alkali metal salts of orthophosphoric acid are preferred because they have good compatibility with the other constituents of the composition and good water solubility.

Preferably, the at least one phosphate comprises potassium dihydrogenphosphate ($KH_2PO_4$), dipotassium hydrogenphosphate ($K_2HPO_4$) or potassium phosphate ($K_3PO_4$) or a mixture thereof.

Preferably, the at least one phosphate has a proportion by weight of 0.50-10.00 percent by weight, preferably of 0.75-8.00 percent by weight, even more preferably of 1.00-5.00 percent by weight, based on the total weight of the composition.

When the at least one corrosion inhibitor contains more than one phosphate, the proportion by weight of the at least one phosphate is calculated on the basis of the sum total of the weights of the individual phosphates.

Preferably, the composition additionally comprises at least one amine. Preferably, the at least one amine has a boiling point of 255° C. or lower at standard pressure, i.e. at 1013.25 hPa.

Preferably, the at least one amine is selected from the group consisting of ethanolamine, dimethylaminoethanol, methylethanolamine, N,N-diethylethanolamine, 2-amino-2-methylpropanol, N-butylethanolamine, methyldiisopropylamine, methyldiethanolamine, diisopropanolamine and 2-amino-2-methylpropane-1,3-diol.

It has been found that, surprisingly, when the composition contains at least one amine in addition to the at least one phosphate, less phosphate is required to achieve the same corrosion-inhibiting effect. In addition, it has been found that elevated amounts of phosphate lead to a deterioration in the absorption properties of the hydrogel. On the other hand, it has been observed that the swelling properties of the hydrogel are adversely affected in the case of relatively high amounts of amine, which distinctly worsens the sealing properties of the hydrogel.

When the at least one corrosion inhibitor comprises at least one phosphate and the composition additionally comprises at least one amine, the concentration of the phosphate in the composition can be adjusted such that the resulting hydrogel has optimal corrosion protection and simultaneously optimal water absorption and optimal swelling properties. It may also be advantageous that the at least one amine functions as an accelerator for the polymerization reaction in the composition.

When the composition additionally comprises at least one amine, the at least one phosphate preferably has a proportion by weight of 0.10-5.00 percent by weight, more preferably of 0.30-4.00 percent by weight and even more preferably of 0.50-3.00 percent by weight, based on the total weight of the composition.

Preferably, the at least one amine has a proportion by weight of 1.00-10.00 percent by weight, more preferably of 2.00-8.00 percent by weight and even more preferably of 3.00-6.00 percent by weight, based on the total weight of the composition.

The molar ratio of the at least one phosphate to the at least one amine is preferably in the range from 1:20 to 1:1 and more preferably in the range from 1:15 to 1:5.

Preferably, the total molar proportion of the at least one phosphate and the at least one amine is in the range from 1.0 to 15.0 mole percent, more preferably in the range from 3.0 to 10.0 mole percent.

Free-radical initiators used in the composition may be known initiators for free-radical reactions, for example alkali metal persulfates, ammonium persulfates and hydrogen peroxides or azobisisobutyronitrile (AIBN) or organic peroxides such as dibenzoyl peroxide. Because the composition of the invention contains water, particular preference is given to the use of a water-soluble free-radical initiator in the form of an alkali metal persulfate, ammonium persulfate or hydroperoxide.

Preferably, the composition additionally comprises an accelerator for the polymerization reaction. The accelerator is preferably selected from the group consisting of transition metal salts, ascorbic acid, transition metal complexes and amines.

When the composition includes at least one amine, the accelerator is selected from the group consisting of transition metal salts, ascorbic acid, transition metal complexes and further amines other than the at least one amine.

Preferably, the other amine has a boiling point higher than 255° C. at standard pressure, i.e. at 1013.25 hPa. It may also be advantageous that the at least one amine functions as an accelerator for the polymerization reaction in the composition, and that no additional accelerator is required.

Amines suitable as accelerators are especially selected from the group consisting of trialkanolamines, preferably triethanolamine, diethanolamine, amino (meth)acrylates, preferably dimethylaminoethyl methacrylate (DMAEMA) or dimethylaminopropyl methacrylate (DMAPMA), N,N-dimethylaniline, N,N-diethylaniline, N,N-bis(hydroxyalkyl) anilines such as N,N-bis(2-hydroxyethyl)aniline, N,N-alkylhydroxyalkylanilines such as N-ethyl-N-hydroxyethylaniline, N,N-dimethyl-p-toluidine, N,N-diethyl-p-toluidine, N-methyl-N-hydroxyethyl-p-toluidine, N,N-bis(2-hydroxyethyl)-p-toluidine and alkoxylated N,N- bis(hydroxyethyl)-p-toluidines, N-ethoxylated p-toluidine, N,N-bis(2-hydroxyethyl)xylidine, N-alkylmorpholine and mixtures thereof.

Suitable transition metal salts and transition metal complexes are, for example, salts and complexes of cobalt, nickel, copper, manganese, vanadium or iron.

An appropriate selection of which accelerator is used generally depends on the free-radical initiator used in each case. The person skilled in the art is aware of suitable combinations. For example, aromatic amines are suitable accelerators for dibenzoyl peroxide, transition metal compounds are suitable accelerators for organic or inorganic hydroperoxides, and ascorbic acid and tertiary amines, such as triethanolamine or DMAPMA, are suitable accelerators for persulfate salts.

Preferably, the at least one free-radical initiator has a proportion by weight of 0.05-2.00 percent by weight, more preferably of 0.10-1.00 percent by weight, based on the total weight of the composition.

Preferably, the accelerator has a proportion by weight of 0.50-10.00 percent by weight, more preferably of 1.00-7.00 percent by weight, based on the total weight of the composition.

Preferably, the composition additionally comprises at least one sulfo group-comprising, ethylenically unsaturated, free-radically polymerizable water-soluble compound, such as a sulfo group-comprising (meth)acrylate, a salt or an ester of the sulfo group-comprising (meth)acrylate, a sulfo group-comprising (meth)acrylamide or a mixture thereof.

However, it has been found that an excessively high concentration of the acrylaminosulfonic acids tends to lead to excessive swellings of more than 300%, which is considered to be unsuitable for sealing applications.

In addition, the composition of the invention may comprise a polymerization inhibitor. Commercial compositions comprising (meth)acrylic compounds generally comprise polymerization inhibitors in order to avoid spontaneous polymerization or to adjust the polymerization times, or reaction times.

In addition to the abovementioned constituents, the composition of the invention may comprise one or more auxiliaries that are commonly known for this sector.

Examples of auxiliaries of this kind include aqueous polymer dispersions or polymer lattices, such as ethylene-vinyl acetate dispersions or acrylate dispersions, dyes, water-soluble plasticizers or fillers, such as polyethylene glycols, and water-insoluble fillers. The addition of the latter auxiliaries is normally not preferred because the additional constituents can adversely interact with the composition, particularly by sedimentation. In this respect, the filler, if utilized, is a water-insoluble filler having a density in the range from 0.9 to 1.1 g/mL. Preferably, the water-insoluble filler has a solubility of less than 2.0 g/100 g of water, more preferably of less than 0.5 g/100 g of water, at 20° C.

Preferably, the total proportion by weight of these auxiliaries is in the range from 0.05 to 30.0 percent by weight, more preferably in the range from 0.10 to 20.0 percent by weight, based on the total weight of the composition.

It may be advantageous when the composition consists of the following constituents:
   at least one ethylenically unsaturated, free-radically polymerizable water-soluble compound,
   at least one free-radical initiator, preferably also including at least one accelerator,
   water,
   a corrosion inhibitor comprising at least one phosphate, optionally auxiliaries, wherein the proportion of the auxiliaries is less than 20.0 percent by weight, preferably less than 10.0% by weight and more preferably less than 5.0 percent by weight, based on the total weight of the composition.

The composition preferably comprises:
   at least one water-soluble (meth)acrylic compound, where the proportion of the at least one water-soluble (meth)acrylic compound is 25.0-65.0 percent by weight, especially 35.0-55.0 percent by weight, based on the total weight of the composition,
   at least one free-radical initiator, preferably also including at least one accelerator,
   water,
   a corrosion inhibitor comprising at least one phosphate, wherein the proportion of phosphate is 0.15-10.00 percent by weight, especially 1.00-5.00 percent by weight, based on the total weight of the composition.

The composition preferably comprises:
   at least one water-soluble (meth)acrylic compound selected from the group consisting of hydroxyethyl acrylate (HEA), hydroxyethyl methacrylate (HEMA), hydroxypropyl acrylate (HPA), hydroxypropyl methacrylate (HPMA), hydroxybutyl acrylate (HBA) and hydroxybutyl methacrylate (HBMA), or a mixture thereof, where the proportion of the at least one water-soluble (meth)acrylic compound is 25.0 to 65.0 percent by weight, especially 35.0-55.0 percent by weight, based on the total weight of the composition,
   at least one free-radical initiator selected from the group consisting of alkali metal persulfates, ammonium persulfate, hydrogen peroxide, azobisisobutyronitrile (AIBN) and dibenzoyl peroxide, or a mixture thereof,
   at least one accelerator selected from the group consisting of transition metal salts, ascorbic acid, transition metal complexes and amines,
   water, where the weight ratio of the at least one water-soluble (meth)acrylic compound to water is in the range from 0.1:1 to 3:1, preferably in the range from 0.5:1 to 1.5:1,
   at least one corrosion inhibitor comprising at least one phosphate selected from the group consisting of potassium dihydrogenphosphate ($KH_2PO_4$), dipotassium hydrogenphosphate ($K_2HPO_4$) or potassium phosphate ($K_3PO_4$) or a mixture thereof, where the proportion of the phosphate is 0.10-5.00 percent by weight, especially 0.50-1.50 percent by weight, based on the total weight of the composition.

In injection applications, very low viscosities are indispensable since the compositions have to be brought through tight passages to the desired site of application, and should also very substantially completely fill a cavity to be filled. This is especially true of crack sealing applications, in which the material introduced has to be distributed within very narrow gaps.

The composition therefore preferably has a viscosity of less than 500 mPa·s, preferably less than 200 mPa·s and even more preferably less than 100 mPa·s, measured with a Brookfield viscometer at 23° C.

The viscosity of the composition is generally relatively low at the start, since the composition comprises mainly water and water-soluble ingredients. The viscosity can be adjusted, for example by the adjustment of the ratio of the at least one ethylenically unsaturated, free-radically polymerizable water-soluble compound to water or via the molecular weight of the ethylenically unsaturated, free-radically polymerizable water-soluble compound.

The pH of the composition prior to the polymerization reaction is preferably in the range from 7.0 to 13.0, even more preferably in the range from 8.0 to 12.0.

Preferably, the gel time of the composition at a temperature of 23° C. is in the range from 30 s to 90 min, more preferably in the range from 1 min to 70 minutes, even more preferably in the range from 5 min to 60 min.

The present invention also relates to a method of sealing joins, penetrations and other leak sources, especially in the construction sector, comprising:
i) making up a composition of the invention,
ii) applying the composition to the site to be sealed, where the composition polymerizes and forms a hydrogel.

Preferably, the hydrogel has a swelling of more than 0.0%, more preferably of at least 5.0% and even more preferably of at least 10.0%. In the case of sealing applications, a hydrogel having a swelling of less than 0% is undesirable since gels of this kind cannot prevent the ingress of moisture.

The constituents of the composition of the invention can be mixed in any sequence in order to provide the composition of the invention. The mixing step is usually conducted by mixing the constituents by mixing or stirring them together. Suitable means of mixing are static mixers, dynamic mixers, especially container/stirrer-type mixers such as rotor-stator, dissolver, colloidal and butterfly mixers. For example, the constituents can be mixed in a static mixer when the open time of the composition of the invention is relatively short, or in a container/stirrer-type mixer when the open time is relatively long.

After the constituents have been mixed, the polymerization reaction commences. The polymerization of the composition is preferably effected at temperatures in the range from 0° C. to 60° C., even more preferably in the range from 5° C. to 40° C.

The pH of the hydrogel is preferably in the range from 7.0 to 13.0, even more preferably in the range from 8.0 to 12.0.

The filling step (applying the composition to the site to be sealed) should be commenced shortly after the composition has been made up and should have been concluded within the open time of the composition. Alternatively, the constituents of the composition can be mixed with a static or dynamic mixer during the filling step. In the filling step, the composition is applied to a site to be sealed, at which it forms a hydrogel after polymerization. The open time is dependent on the constituents of the composition and the amounts thereof.

The present invention also relates to a method of creating a steel-passivating layer in a cavity of a previously damaged reinforced concrete construction, comprising:
i) making up a composition of the invention,
ii) introducing the composition into a cavity of the reinforced concrete structure, in which the composition polymerizes and forms a steel-passivating layer in the form of a hydrogel.

Another aspect of the present invention relates to the use of a composition of the invention as injection medium for sealing joins, penetrations and other leak sources, especially in the construction sector, wherein the composition is injected into a cavity.

The constituents of the composition of the invention are preferably stored and brought to the site of use as a ready-to-use kit in the form of a two or more components present composition. The amount of water required is mixed with the two-component or multicomponent composition immediately prior to application.

The two-component or multicomponent composition may comprise, for example, a component containing at least one ethylenically unsaturated, free-radically polymerizable water-soluble compound and optionally an accelerator, and another component containing a free-radical initiator. Alternatively, the at least one ethylenically unsaturated, free-radically polymerizable water-soluble compound, the free-radical initiator and the accelerator, if used, may be present as separate components in a multicomponent composition.

A portion of the amount of water required may be present in one or more components of the two-component or multicomponent composition. However, it is preferable that not more than 20.0%, preferably not more than 5.0%, of the total amount of water is present in the two-component or multicomponent composition, and that the residual amount of water is brought separately to the site of use and mixed with the two-component or multicomponent composition. It is thus possible to distinctly reduce the transport costs.

Another aspect of the present invention relates to a two-component or multicomponent composition comprising all constituents of the composition of the invention, wherein the amount of water is not more than 20.0%, preferably not more than 5.0%, of the total amount of water in the composition of the invention.

The at least one corrosion inhibitor may be present in one or more water-containing components of the two-component or multicomponent composition. Alternatively, the at least one corrosion inhibitor may be mixed with a portion of the residual amount of water.

Another aspect of the present invention relates to a precursor for production of a composition of the invention. The precursor comprises all the constituents of the composition of the invention, where the proportion by weight of water is less than 1.0 percent by weight, preferably less than 0.50 percent by weight, based on the total weight of the precursor. In the production of the composition of the invention, the required amount of water is then added to the precursor. The precursor may comprise two or more components, which components are mixed together with the amount of water required to make up the inventive composition.

A further aspect of the present invention relates to a hydrogel obtainable by polymerizing a composition of the invention.

Preferably, the hydrogel has a swelling of more than 0.0%, more preferably of at least 5.0% and even more preferably of at least 10.0%. In the case of sealing applications, a hydrogel having swelling of less than 0% is undesirable since gels of this kind cannot prevent the ingress of moisture.

The pH of the hydrogel is preferably in the range from 7.0 to 13.0, even more preferably in the range from 8.0 to 12.0.

A further aspect of the present invention relates to the use of a hydrogel of the invention for sealing joins, penetrations and other leak sources, especially in the construction sector.

EXAMPLES

Adduced hereinafter are working examples which are intended to elucidate the invention described in detail. It will be appreciated that the invention is not restricted to these described working examples.

The following materials were used in the experiments:

TABLE 1

| | | |
|---|---|---|
| HEMA | hydroxyethyl methacrylate (HEMA) comprising 400 ppm of hydroquinone monomethyl ether (HMME) as polymerization inhibitor | |
| Na-AMPS | sodium salt of AMPS ® (2-acrylamido-2-methylpropanesulfonic acid), 50% solution in water | AMPS ® 2405 Monomer, Lubrizol |
| TEA | triethanolamine (technical grade quality, 85% TEA/15% diethanolamine) | Triethanolamin 85, Ineos Oxide |
| NAPS | sodium persulfate (diluted with water to a 10 wt % solution) | CAS # 7775-27-1 |
| KOH | potassium hydroxide | CAS # 1310-58-3 |
| Ethanolamine | | CAS # 141-43-5 |
| 2-Amino-2-methyl-1-propanol | | CAS # 124-68-5 |
| MDiPA | N-methyldiisopropanolamine | CAS # 4402-30-6 |
| Dipotassium hydrogenphosphate | | CAS # 7758-11-4 |
| Tripotassium phosphate | | CAS # 7778-53-2 |
| Potassium dihydrogenphosphate | | CAS # 7778-77-0 |

Determination of the Relevant Properties

The corrosion properties of the test compositions were tested in a measurement arrangement according to European Standard EN 480-14.

For the corrosion experiments, three test specimens were produced from each composition tested. In the production of the test specimens, Teflon molds with steel electrodes inserted therein were filled with the test compositions. After the test compositions had polymerized to completion, the resulting hydrogels with the steel electrode embedded in each case were removed from the molds.

In the subsequent corrosion test, a constant voltage, relative to a reference electrode, was applied to the steel electrode of the test specimen. The voltage chosen corresponds to the potential difference that can be observed for steel in concrete.

All the harmful effects that emanate from the composition are immediately apparent since the induced current flow does not stop owing to lack of passivation, which leads to increasing anodic dissolution of the steel electrode.

The electrolyte used in the test cell was a saturated calcium hydroxide solution at a temperature of 20° C.

The result of the corrosion test is either "passed" or "failed".

The viscosity of the composition was determined at 23° C. prior to the polymerization reaction with a Physica MCR101 viscometer to ISO 3219 with a coaxial cylinder measurement system at a cone angle of 120°.

The gelation time ("gel time") at 23° C. was determined by visual testing with a 40 g batch of the composition tested in a beaker of diameter 4.5 cm. Gel time corresponds to the time before which the first gel structures are visually apparent in the reaction solution.

For the swelling in water ("swelling"), samples having dimensions of 2.5×1.25×1.25 cm were cut out of the test specimens produced as described above and placed into demineralized water at 23° C. such that free swelling in the test medium is possible. The change in weight of the test specimens introduced was determined by gravimetric means after storage in water for 3 d and 7 d. The curing time before storage in water was 24 h.

Example 1

The inventive compositions EX1 to EX6 were produced by mixing the constituents as listed in table 2. The gel time of the compositions obtained was in the range from 3 to 6 minutes, and the compositions comprising 2.0 percent by weight or more of phosphate passed the DIN EN 480-14 corrosion test.

TABLE 2

| Experiment | EX 1 | EX 2 | EX 3 | EX4 | EX 5 | EX 6 |
|---|---|---|---|---|---|---|
| Constituent, percent by weight | | | | | | |
| HEMA | 50 | 50 | 50 | 50 | 50 | 50 |
| Water | 36 | 37 | 35 | 37 | 35 | 37 |
| TEA (50% in water) | 9 | 9 | 9 | 9 | 9 | 9 |
| NAPS (10% in water) | 3 | 3 | 3 | 3 | 3 | 3 |
| Dipotassium hydrogenphosphate | 2 | 1 | | | | |
| Tripotassium phosphate | | | 3 | 1 | | |
| Potassium dihydrogenphosphate | | | | | 3 | 1 |
| Total, % by wt. | 100 | 100 | 100 | 100 | 100 | 100 |
| Results | | | | | | |
| Gel time (min) | 3 | 3 | 3 | 3.5 | 6 | 4 |
| pH (average) | 10.1 | 10 | 11.7 | 10.9 | 8.0f/ 8.0a1h | 8.7fresh |
| Swelling 3 d, [%] | 114 | 80 | 23 | 28 | 129 | 122 |
| Swell rate 7 d, [%] | 150 | 97 | 9 | 22 | 140 | 131 |
| DIN EN 480-14 passed | yes | no | yes | no | yes | no |
| Viscosity at 23° C., mPa · s | 5.0 | n.m. | 6.0 | n.m. | 5.0 | n.m. | n.m., not measured

Example 2

The inventive compositions EX7 to EX11 were produced by mixing the constituents as listed in table 3. The gel time of the compositions obtained was in the range from 3 to 6 minutes, and the compositions comprising 1.0 percent by weight or more of phosphate together with alkanolamines passed the DIN EN 480-14 corrosion test. The viscosities of the compositions were in the region of 5.0 mPa·s.

TABLE 3

| Experiment | EX 7 | EX 8 | EX 9 | EX 10 | EX 11 |
|---|---|---|---|---|---|
| Constituent, % by wt. | | | | | |
| HEMA | 50 | 50 | 50 | 50 | 50 |
| Water | 34.5 | 34 | 32.5 | 32 | 31 |
| TEA (50% in water) | 9 | 9 | 9 | 9 | 9 |
| NAPS (10% in water) | 3 | 3 | 3 | 3 | 3 |
| Ethanolamine | 3 | 3 | 5 | 5 | |
| MDiPA | | | | | 6 |
| Tripotassium phosphate | | | | | 4 |
| Potassium dihydrogenphosphate | 0.5 | 1 | 0.5 | 1 | 1 |
| Total, % by wt. | 100 | 100 | 100 | 100 | 104 |
| Results | | | | | |
| Gel time (min) | 6 | 5 | 4 | 4 | 3 |
| pH (average) | 10.4 | 10.4 | 10.8 | 10.8 | 9.2 |
| Swelling 3 d, [%] | 109 | 163 | 25 | 117 | 193 |
| Swell rate 7 d, [%] | 113 | 206 | −4 | 194 | 228 |
| Gel consistency | very soft | moderate | moderate | moderate | very soft |
| DIN EN 480-14 passed | no | yes | yes | yes | yes |
| Viscosity at 23° C., mPa · s | n.m. | 5.0 | 5.0 | 5.0 | 6.0 | n.m., not measured

Comparative Examples

Compositions EX12 to EX16 were produced by mixing the constituents as listed in table 4. The gel time of the compositions obtained was in the range from 3 to 5 minutes. None of these compositions contains a phosphate-based corrosion inhibitor and none of the compositions passed the DIN EN 480-14 corrosion test.

TABLE 4

| Experiment | EX 12 | EX 13 | EX 14 | EX 15 | EX 16 |
|---|---|---|---|---|---|
| Constituent, % by wt. | | | | | |
| HEMA | 50 | 50 | 50 | 50 | 50 |
| Water | 36 | 37 | 36 | 35 | 34 |
| TEA (50% in water) | 9 | 9 | 7 | 7 | 7 |
| NAPS (10% in water) | 3 | 3 | 3 | 3 | 3 |
| Ethanolamine | 2 | 1 | 4 | 5 | 6 |
| Total, % by wt. | 100 | 100 | 100 | 100 | 100 |
| Results | | | | | |
| Gel time (min) | 3 | 3.5 | 5 | 4.5 | 5 |
| pH (average) | 10.7 | 10.5 | | | |
| Swelling 3 d, [%] | 19 | 23 | −15 | −16 | −17 |
| Swell rate 7 d, [%] | 0 | 15 | −17 | −17 | −17 |
| DIN EN 480-14 passed | no | no | no | no | no |

The invention claimed is:

1. A composition for sealing joints and penetrations, comprising:
   a) at least one ethylenically unsaturated, free-radically polymerizable water-soluble compound,
   b) at least one free-radical initiator,
   c) water, and
   d) at least one corrosion inhibitor comprising at least one phosphate, wherein:
   the at least one ethylenically unsaturated, free-radically polymerizable water-soluble compound has a proportion by weight of 25 to 55 percent by weight, based on the total weight of the composition,
   the at least one phosphate comprises an alkali metal or alkaline earth metal salt of orthophosphoric acid, or a mixture thereof, and
   a weight ratio of the at least one ethylenically unsaturated, free-radically polymerizable water-soluble compound to water is in a range of from 0.1:1 to 3:1.

2. The composition as claimed in claim 1, wherein the at least one ethylenically unsaturated, free-radically polymerizable water-soluble compound includes at least one water-soluble (meth)acrylic compound.

3. The composition as claimed in claim 1, wherein the at least one phosphate comprises potassium dihydrogenphosphate ($KH_2PO_4$), dipotassium hydrogenphosphate ($K_2HPO_4$), potassium phosphate ($K_3PO_4$), or a mixture thereof.

4. The composition as claimed in claim 1, wherein the at least one phosphate has a proportion by weight of 0.50-10.00 percent by weight, based on the total weight of the composition.

5. The composition as claimed in claim 1, wherein the composition additionally includes at least one amine.

6. The composition as claimed in claim 5, wherein:
   the at least one phosphate has a proportion by weight of 0.10-5.00 percent by weight, based on the total weight of the composition, and
   the at least one amine has a proportion by weight of 1.00-10.00 percent by weight, based on the total weight of the composition.

7. The composition as claimed in claim 5, wherein the composition additionally comprises at least one accelerator for free-radical formation, and the accelerator comprises an ascorbic acid, a transition metal salt, a transition metal complex or a further amine other than the at least one amine.

8. The composition as claimed in claim 1, wherein the composition additionally comprises at least one accelerator for free-radical formation, and the accelerator comprises an ascorbic acid, a transition metal salt, a transition metal complex or an amine.

9. The composition as claimed in claim 1, wherein the pH of the composition is in the range from 7.0 to 13.0.

10. The composition according to claim 1, wherein:
    the composition is a two-component or multicomponent composition, and
    the amount of water in one or more components of the two-component or multicomponent composition is not more than 20.0% of a total amount of water in the two-component or multicomponent composition.

11. The composition as claimed in claim 1, wherein the at least one ethylenically unsaturated, free-radically polymerizable water-soluble compound includes a hydroxy (meth) acrylate selected from the group consisting of hydroxyethyl acrylate (HEA), hydroxyethyl methacrylate (HEMA), hydroxypropyl acrylate (HPA), hydroxypropyl methacrylate (HPMA), hydroxybutyl acrylate (HBA) and hydroxybutyl methacrylate (HBMA), or a mixture thereof.

12. A process for producing the composition as claimed in claim 1, comprising:
    i) providing a precursor comprising:
       a) the at least one ethylenically unsaturated, free-radically polymerizable water-soluble compound,
       b) the at least one free-radical initiator,
       c) water in a proportion less than 1.0 percent by weight, based on the total weight of the precursor, and
       d) the corrosion inhibitor, the precursor being a two-component or multicomponent composition, and
    ii) mixing the precursor with such an amount of water that the weight ratio of the at least one ethylenically unsaturated, free-radically polymerizable water-soluble compound to water is in the range from 0.1:1 to 3:1.

13. An injection medium for sealing joints and penetrations, comprising the composition as claimed in claim 1, wherein the composition is injected into a cavity.

14. A hydrogel obtained by polymerizing a composition comprising:
   a) at least one ethylenically unsaturated, free-radically polymerizable water-soluble compound,
   b) at least one free-radical initiator,
   c) water, and
   d) at least one corrosion inhibitor comprising at least one phosphate, wherein:
   the at least one ethylenically unsaturated, free-radically polymerizable water-soluble compound has a proportion by weight of 25 to 55 percent by weight, based on the total weight of the composition,
   the at least one phosphate comprises an alkali metal or alkaline earth metal salt of orthophosphoric acid, or a mixture thereof, and
   a weight ratio of the at least one ethylenically unsaturated, free-radically polymerizable water-soluble compound to water is in a range of from 0.1:1 to 3:1.

15. A method of sealing joints and penetrations, comprising:
   i) making up the composition as claimed in claim 1, and
   ii) applying the composition to a site to be sealed, where the composition polymerizes and forms a hydrogel.

16. A method of creating a steel-passivating layer in a cavity of a previously damaged reinforced concrete structure, comprising:
   i) making up the composition as claimed in claim 1, and
   ii) introducing the composition into a cavity of the reinforced concrete structure, in which the composition polymerizes and forms a steel-passivating layer in the form of a hydrogel.

\* \* \* \* \*